United States Patent [19]

Ng et al.

[11] Patent Number: 4,680,653
[45] Date of Patent: Jul. 14, 1987

[54] ROTATING STORAGE DEVICE TRACK FORMAT EMULATION

[75] Inventors: Chan Y. Ng; Norman K. Ouchi; David T. Wang, all of San Jose, Calif.; Wellington C. Yu, Wing On Life Garden, Singapore

[73] Assignee: International Business Machines Corporation, Armonk, N.Y.

[21] Appl. No.: 866,632

[22] Filed: May 22, 1986

[51] Int. Cl.⁴ ............................................. G11B 5/012
[52] U.S. Cl. ................................................ 360/72.2
[58] Field of Search ...................................... 360/72.2

[56] References Cited

U.S. PATENT DOCUMENTS

4,223,390 9/1980 Bowers et al. ..................... 364/900

Primary Examiner—George G. Stellar
Attorney, Agent, or Firm—Mark A. Haynes; Henry E. Otto, Jr.

[57] ABSTRACT

Disclosed is a method for recording a record that emulates a first recording format, which includes a track reference point, such as an index field, used for determining a position of a record on a track according to the first recording format, on a moving storage device operating according to a second recording format which also includes a track reference point. The invention comprises the steps, responsive to location information generated according to the first recording formats, of:
(1) determining an original angular position of a record according to the first recording format;
(2) calculating in response to the original angular position and a parameter a preferred angular position for the record according to the second recording format;
(3) determining an actual angular position of the record recorded according to the second recording format; and
(4) recording an extension of the record to compensate for the difference between the preferred angular position and the actual angular position.

17 Claims, 21 Drawing Figures

3380 TRACK
SIZE IN CELLS

FIG. 6A

EMULATING TRACK
SIZE IN CELLS

ROTATING STORAGE DEVICE TRACK FORMAT EMULATION

FIELD OF THE INVENTION

The present invention relates to formats for recording data on moving storage devices. In particular, the present invention is directed to emulation of a recording format designed for one direct access storage device on another direct access storage device that operates according to a different format.

BACKGROUND OF THE INVENTION

Direct access storage devices (DASD) are widely used to store data in computer systems. A common class of DASD can be referred to as moving storage devices. This class includes magnetic tape and disk drives, optical disk recording devices and other types of moving media recording devices.

A commonly used moving storage device is the magnetic media disk drive typified by the IBM systems 3350 and 3380.

Data is typically stored on moving storage devices in the form of records. The records for a given device are recorded according to a particular format.

Advances in recording technology lead to changes in recording format. Thus as a new device is developed, a need arises to emulate the format of older devices already in the field on the newer devices. By providing this emulation capability, the installed recording capacity of devices operating according to varying recording formats can be used along side new devices without complicated reprogramming of data processing systems that utilize the data stored.

The prior art is typified by U.S. Pat. No. 4,223,390, entitled "The System and Method for Attaching Magnetic Storage Devices having Dissimilar Track Capacities and Recording Formats", issued Sept. 16, 1980, invented by Bowers et al. This Bowers et al patent is incorporated by reference for the purpose of illustrating the prior art and typical recording formats.

The Bowers et al invention performed a track format level of emulation which suffers several disadvantages. First, the end of the emulated track on a new device was not at a fixed location. Thus the size of the track being emulated on the new device was of a variable length. Further the Bowers et al emulation did not maintain a positional mapping of record on the new device. This lack of positional mapping could cause early reconnections to a channel trying to access data on the disk and waste channel and control unit time.

The Bowers et al invention did reduce the complexity of reprogramming needed in data processing systems accessing the data but paid a considerabale cost in speed of access to data on the track.

Emulation of complicated recording formats, such as count-key-data (CKD), on new devices having different track characteristics highlight the problems associated with emulation. Thus the following discussion of a typical CKD format is provided for the purposes of background information.

A CKD formatted track includes a number of unique fields. The fields include an index field I, a G1 gap, a home address HA field, a G2' gap and for each record Rn a count field RnC, a G2 gap, an optional key field RnK followed by a G2 gap and a data field RnD followed by a G3 gap. The number or recordable units needed to fill the various types of fields and gaps typically varies from one CKD format to another independent of the content of the data field. Also the gaps are often defined as a number of recordable units necessary on a device operating according to the format needed to provide a time window for execution of control programs. Thus if the device doing emulation of that format operates at a different rotating speed or recording density than the original device, the number of recordable units necessary for a gap that emulates the original format could be proportionally different.

In part due to the complexity of emulating complex recording formats, the prior art has been unable to maintain positional mapping for emulated records. Therefore, modern recording devices, which include a rotational position sensing apparatus to most efficiently utilize channel and control unit time and prevent early reconnection of the channel to the recording device, have been unable to rely on that rotational position sensing apparatus for emulated records.

SUMMARY OF THE INVENTION

The present invention provides a method for track emulation which maintains positional mapping of records on the emulating device. Thus according to the present invention, the rotational position sensing feature of moving storage devices can be utilized when records to be accessed emulate a format of a different device.

In one aspect, the invention is a method for recording a record that emulates a first recording format, which includes a track reference point, such as an index field, used for determining a position of a record on a track according to the first recording format, on a moving storage device operating according to a second recording format which also includes a track reference point. The first recording format includes a first number of recordable units per track and the second recording format includes a second number of recordable units per track. The invention comprises the steps, responsive to location information generated according to the first recording format, of:

(1) determining an original angular position of a record according to the first recording format;

(2) calculating in response to the original angular position and a parameter a preferred angular position for the record according to the second recording format;

(3) determining an actual angular position of the record recorded according to the second recording format; and (4) recording an extension of the record to compensate for the difference between the preferred angular position and the actual angular position.

The extension of the record operates to maintain the relative angular position of a following record. In this manner, addresses locating a record according to the first format can be used in conjunction with a rotational position sensor to accurately locate the record on a device operating according to a second format.

DETAILED DESCRIPTION

With reference to the figures, a detailed description of the present invention is provided. The preferred embodiment of the present invention maintains an emulation index at a constant location on the track of the new device. The calculation of the emulation index, or track size, is first described. Then two alternative methods for writing tracks on a device emulating a recording format of a different device are described. Next, the steps required for accessing the emulated track based on information designed to access the original track are set forth. Last, a specific example is provided.

EMULATED TRACK SIZE DETERMINATION

Figures 1A, 1B:
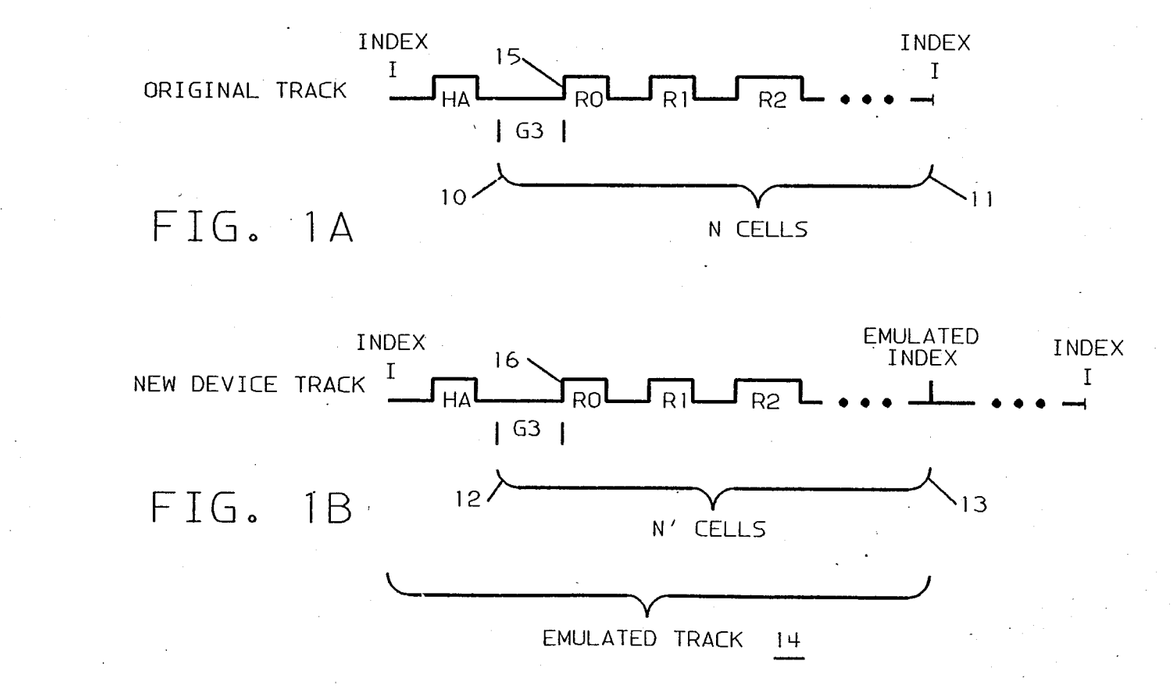
FIGS. 1A and 1B illustrate an original track format and a new device track on which the original format is emulated.

With reference to FIGS. 1A and 1B, the determination of the size of an emulated track is set forth for an original CKD formatted record R0 15 recorded as R0 16 on a new device. According to the present invention, the new device track (FIG. 1B) maintains a fixed emulation index 13. The location of that emulation index 13 determines the size of the emulated track 14.

The emulated track size is determined by finding a theoretical first record R0 15,16 such that the ratio of the size of a complete R0 16 in recordable units, such as cells, on the new device track to the size of the same R0 15 on the original track is the maximum. This ratio can be approximated by a parameter, $H'/H$, where $H'$ are both small integers. This approximation is valid as long as $H'/H$ is equal to or larger than the ratio of the sizes of the original R0 15 to the R0 16 on the new device.

Starting with the G3 gap 10 in front of R0 16, for every H cells on the original track, the emulated track 14 on the new device matches it with H' cells as follows:

Let N = number of cells on the original track (FIG. 1A) from the G3 10 in front of R0 15 to the index 11 at the end of the track.

Let N' = number of cells on the new device track (FIG. 1B) from the G3 12 in front of R0 16 to the emulation index 13 at the end of the emulated track 14.

Then N' = floor integer value of (N * H' / H) (In other words, (N*H'/H) rounded down to the largest whole integer.)

Thus counting from the GE 12 in front of R0 16, the emulated track 14 has N' cells. This emulated track size N' is the minimum or close to minimum size on a new device track that will accommodate emulation of any track recorded according to the original format on an original device.

The space on the track between the last emulated record and the emulated index is erased of formatted records to facilitate processing of new records. The erasing of records may be done under control unit control or by host command. If the control unit is involved, the erasing can be easily stopped at the emulated index. Otherwise the erasing could continue to the real end of the track to simplify the process.

FIRST METHOD FOR FORMATTING A TRACK TO EMULATE A DIFFERENT FORMAT

The original track is formatted on the new device track by matching every H cells of the original track with H' cells on the new device track on a record to record basis as follows:

1. Consider the formatted first record R0 20 on the original track shown in FIG. 2A having a count field R0C, a key field R0K and a data field R0D along with the G3 and G2 gaps.

Figures 2A, 2B:
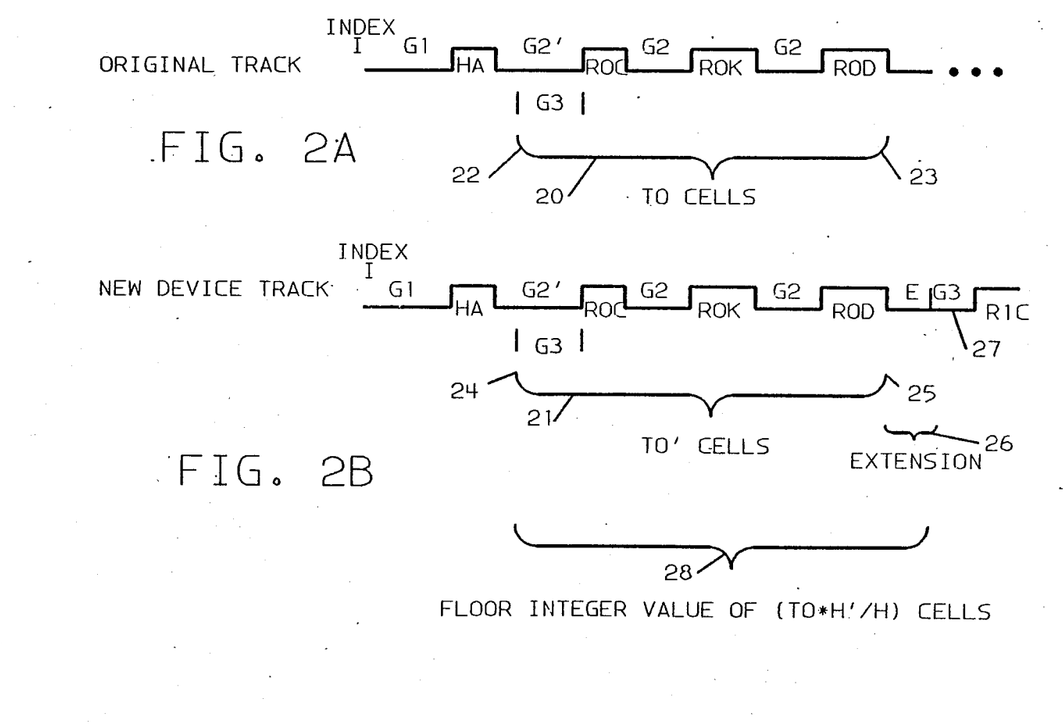
FIGS. 2A and 2B illustrate a format of a first record on an original track and the format of the record on a new device emulating the original format for the purposes of describing a first method for recording the emulated record.

2. Emulate the same R0 21 on the new device track as shown in FIG. 2B.

3. Extend the end 25 of R0 data field R0D on the new device track by an extension E 26 of pad units in the next G3 gap 27 as follows:

Let T0 = number of cells occupied by the R0 20 on the original track from the G3 22 gap in front of R0 20 to the end 23 of R0 data field R0D.

Let T0' = number of cells occupied by R0 21 on the new device track from the G3 gap 24 in front of R0 21 to the end 25 of R0 data field R0D.

T0'/T0 = < H'/H by definition of H' and H. So, T0' = < T0*H'/H.

Since T0' is an integer, T0' = < floor integer value of (T0*H'/H)

The Extension E 26 on the new device track of the G3 gap 27 following the R0 data field R0D is the difference between T0' and the floor integer value of (T0*H'/H) 28. Thus, the ending of R0 is extended by pad units from T0' to the floor integer value of (T0*H'/H) which is the preferred value for the number of cells to be occupied by the record.

Figure 3A:
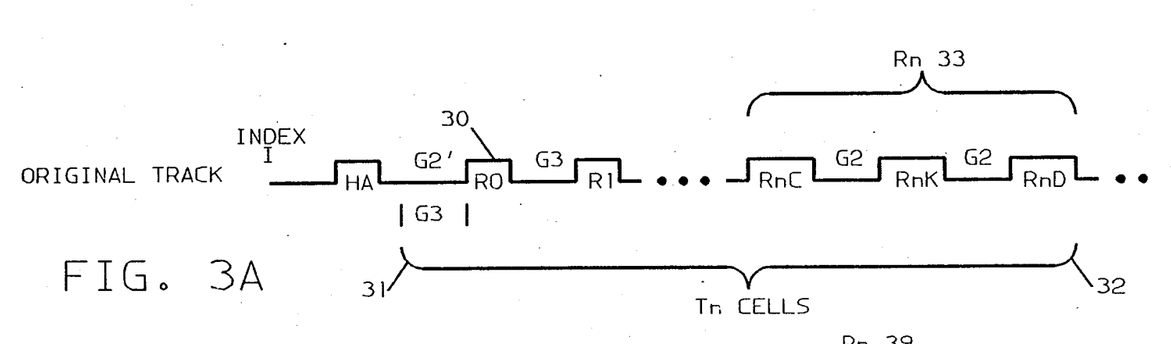
FIGS. 3A and 3B further illustrate the format of an emulated record on a new device track for the purposes of illustrating the first method of emulation described in the disclosure.
Figure 3B:
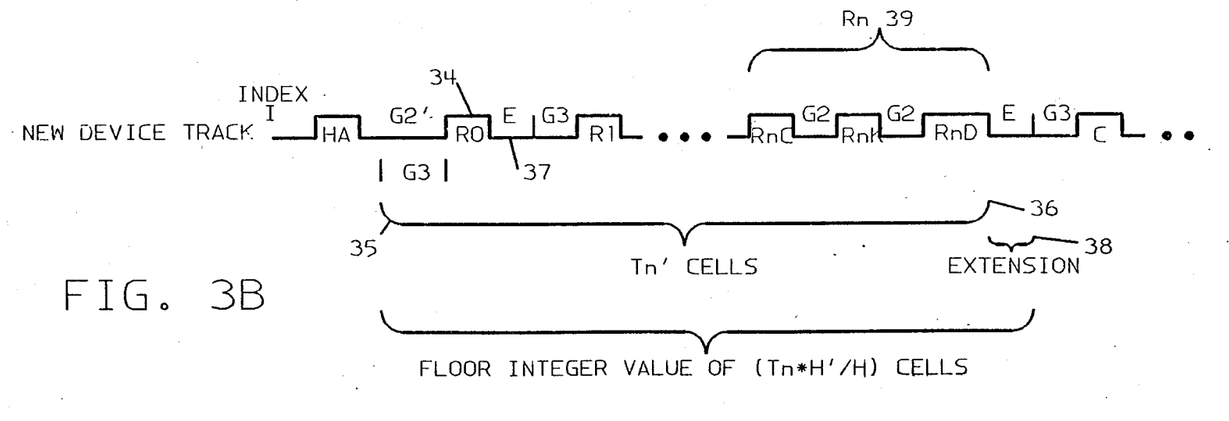

Similarly the end of the nth record on the new device track is extended, as described with reference to FIGS. 3A and 3B, by extending the G3 gap following the nth record Rn as follows:

Let Tn = number of cells occupied by R0 30 and the next n records on the original track (FIG. 3A) from the G3 gap 31 in front of R0 30 to the end 32 of the data field RnD of nth record Rn 33.

Let Tn' = number of cells occupied by R0 34 and the next n records on the new device track (FIG. 3B) from the G3 gap 35 in front of R0 34 to the end 36 of the data field RnD of the nth record Rn 39. This includes all the extensions, such as extension E 37 to R0, to G3s before the nth record Rn 39.

The G3 extension E 38 on the emulated track following the nth record Rn is the difference between Tn' and the floor integer value of (Tn*H'/H). That is, the ending of the nth record is extended from Tn' to the floor integer value of (Tn*H'/H). Thus, extension E= < (floor integer value of (Tn*H'/H))−Tn'.

Since the nth record can be the last record, this method also proves that the original track without partial records can always be emulated within the emulated track size before the emulation index by adding the variable extensions E to the G3 gaps as described. Of course the extensions can be added to other fields in the track, so long as they occur with the record being extended before following records. Of course, track reference points other than the front of the G3 gap preceding R0 can be used or the reference point can change for each record as suits a designer.

The calculation of gap extension shown above requires the value of Tn indicating the angular position of the record on the original track. This can be done by putting the corresponding original device cell number of each record into the count field of the logical track. This typically requires a 2 byte parameter in the count field.

SECOND METHOD FOR FORMATTING THE EMULATED TRACK

The gap extension can also be derived from a one byte parameter in the count field as described below.

Figure 4A:
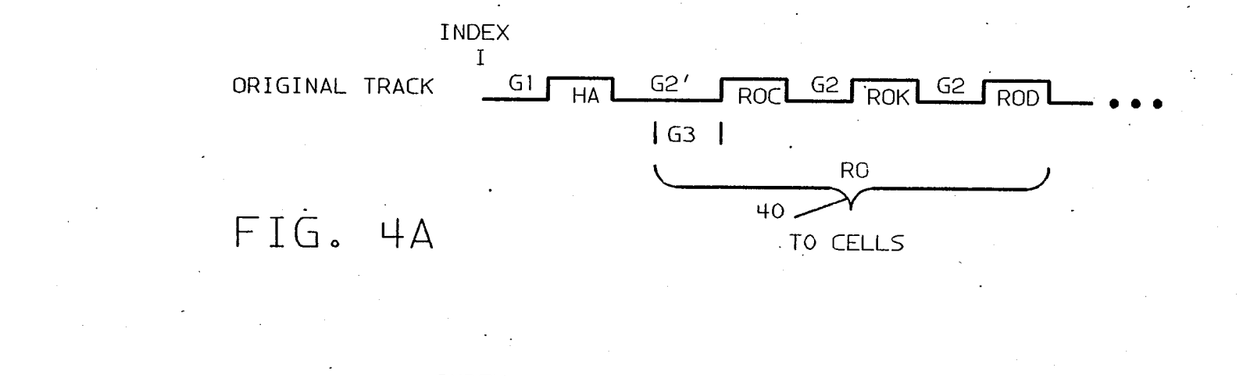
FIGS. 4A through 4D illustrate the emulation of the first and second record according to an original track format on a new device according to a second method for emulation disclosed in the specification.
Figure 4B:
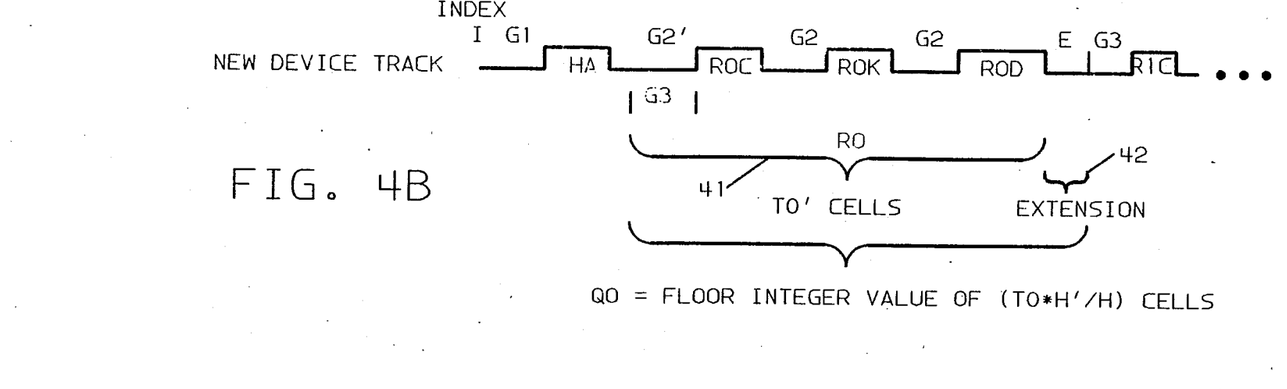

Beginning with record R0 41 (Compare FIGS. 4A and 4B), extend each record on the logical track to the floor integer value of TN*H'/H as follows:

Let $Tn*H'/H = Q_n + P_n/H$, where both $Q_n$ and $P_n$ are integers and $P_n < H$.

Then the G3 extension E 42 after record R0 41 is $Q_0 - T0'$, i.e. extend the size of record R0 41 from T0' to $Q_0$ on the emulated track, where $Q_0$ is the floor integer value of $T0*H'/H$ and $P_0$ is the remainder. The one byte parameter to be stored on the count field of the following record R1 is the remainder value $P_0$.

Figure 4C:
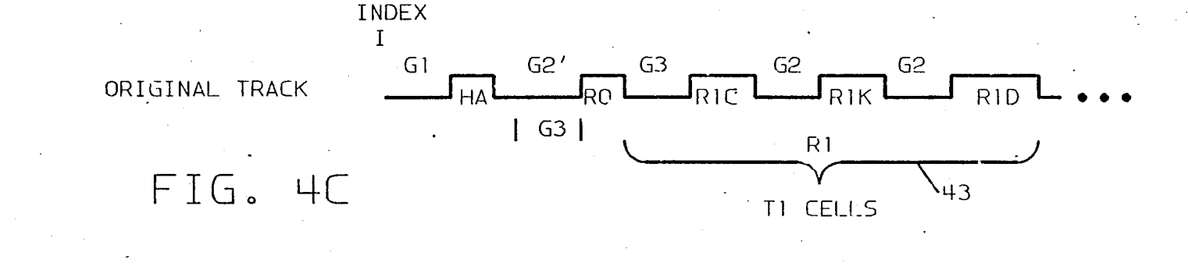
Figure 4D:
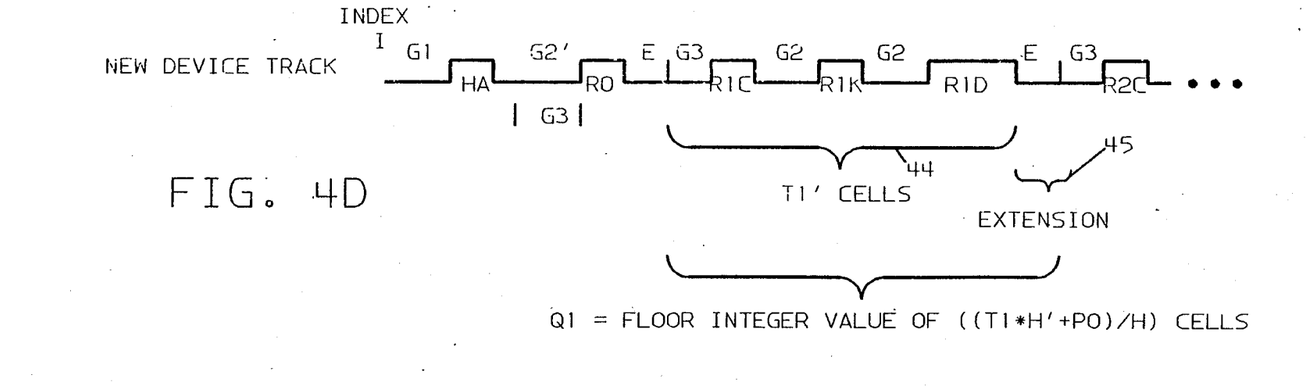

The size of the following record R1 43 having a length T1 on the original track (FIG. 4C) and a length T1' as record R1 44 on the new device track (FIG. 4D) is extended as follows:

$$T1*H'/H + P_0/H = (T1*H' + P_0)/H = Q_1 + P_1/H$$
where both $Q_1$ and $P_1$ are integers and $P_1 < H$.

Then the G3 extension E 45 after record R1 44 is $Q_1 - T1'$. That is, record R1 is extended from T1' cells to $Q_1$ cells on the emulated track. The one byte parameter to be stored on the count field of R2 is $P_1$. This same process can be applied to the rest of the records on the track.

Thus for the nth record, extension E=(floor integer value of $((Tn*H' + P_{n-1})/H) - Tn'$.

This method considers each record individually. It matches each H cells on the original record with H' cells on the emulated record by taking the remainder from the previous record into consideration. This permits incremental addition of records in sequence with only the previous record read. In contrast, the first method disclosed treats the track as a whole and requires starting at a track reference point. This method only requires memory space for a one byte parameter to keep track of the remainder of extension from previous record, preferably in the count field of the record.

In the case of H'/H=1, there is no need to keep any remainder parameter in the count field.

This remainder parameter approach is particulary amenable to hardware implementation. Counters can be used to keep track of the number of recordable units needed to record the record according to the first format (Tn), the number of recordable units actually used according to the format of the emulating device (Tn') plus the remainder carried over from any previous record. A stored parameter H'/H would be combined with the value Tn in a multiplier. At the end of a record, the difference between Tn' plus the remainder from a previous record and Tn times the parameter H'/H would be instantly available for writing as an extension and the remainder parameter to be carried over to the next record would be used to initialize the Tn' counter.

CALCULATION OF CELL LOCATION ON EMULATED TRACK

Figure 5A:
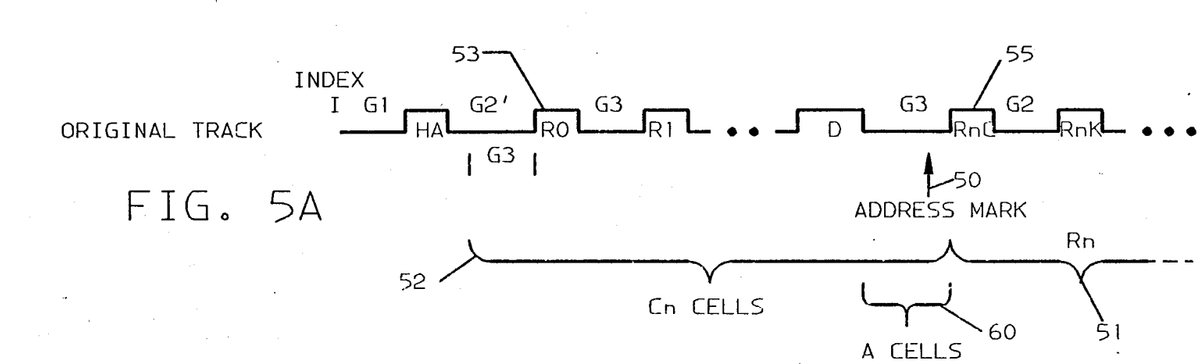
FIGS. 5A and 5B are track format sketches used to illustrate how information designed for locating a track according to an original format can be used to locate a record recorded according to the present invention which emulates that original format.
Figure 5B:
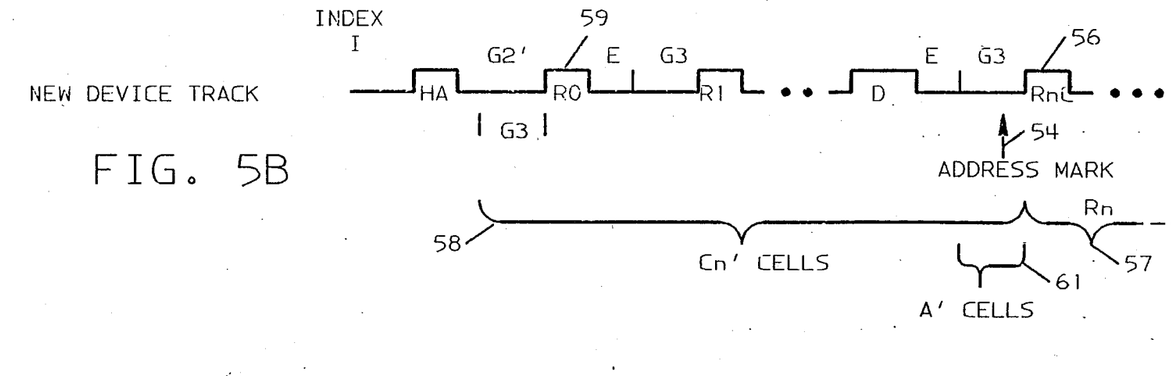

With reference to FIGS. 5A and 5B, the count field location of an emulated record on a new device is calculated from the count field location of an original record on the original track.

Let Cn = the cell number of the Address Mark A 50 of a count field RnC 55 of record Rn 51 on the original track (FIG. 5A) counting from the G3 52 in front of R0 53.

Let Cn' = the cell number of the Address Mark A 54 of the count field RnC 56 of the corresponding emulated record Rn 57 on the emulated track (FIG. 5B) counting from the G3 58 in front of R0 59.

Then Cn' = A' + floor integer value of $((Cn - A)*H'/H)$ where A is the displacement 60 of the Address Mark 50 from the beginning of the G3 on the original track (a constant integer of cells) and where A' is the displacement 61 of the Address Mark 54 from the beginning of the G3 (without extension) on the new track (a constant integer of cells).

Thus given the cell number of a count field of a record on the original track, the unique cell number Cn' of the count field of the corresponding record on the emulated track is easily calculated using microcode or hardware.

So according to this invention, the relative position of an emulated record on the moving storage media is maintained making available the use of position sensors for accurate positioning of read or write heads accessing the record without complicated recalculation of the position.

EXAMPLE TRACK EMULATION

In the preferred implementation microcode will be involved in the emulation. There is no hardware assistance, although those skilled in the art will recognize that the invention can be implemented in hardware.

The example described uses the first method described above. The following shows a more detailed example of how an IBM System 3380, or equivalent, track is emulated on a new device track. Algorithms for the emulation example are also be provided.

Figure 6A:
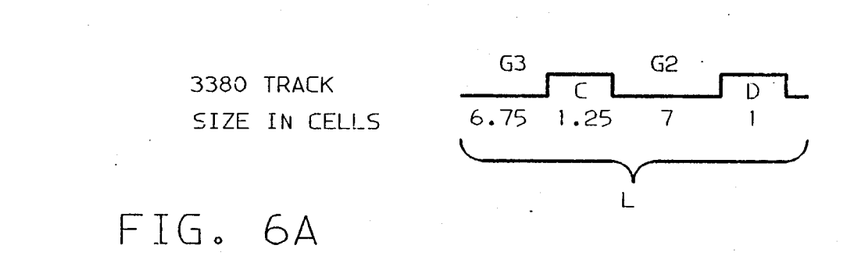
FIGS. 6A and 6B are used to illustrate the size in cells of a selected record on an IBM system 3380 track and on a track emulating the format of the system 3380.
Figure 6B:
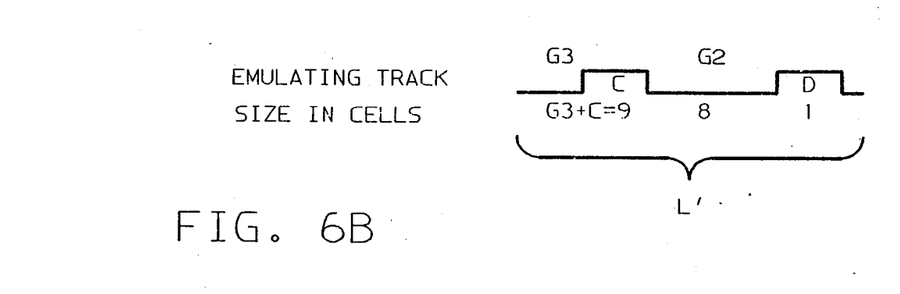

A record that maximizes L'/L has no key field and a data field D having one cell as shown in FIGS. 6A and 6B. Thus for the 3380, L equals 16 cells and L' on the new device track equals 18. So H'/H equals L'/L, or 18/16. Therefore, H' is 9 and H is 8.

Figures 9A, 9B:
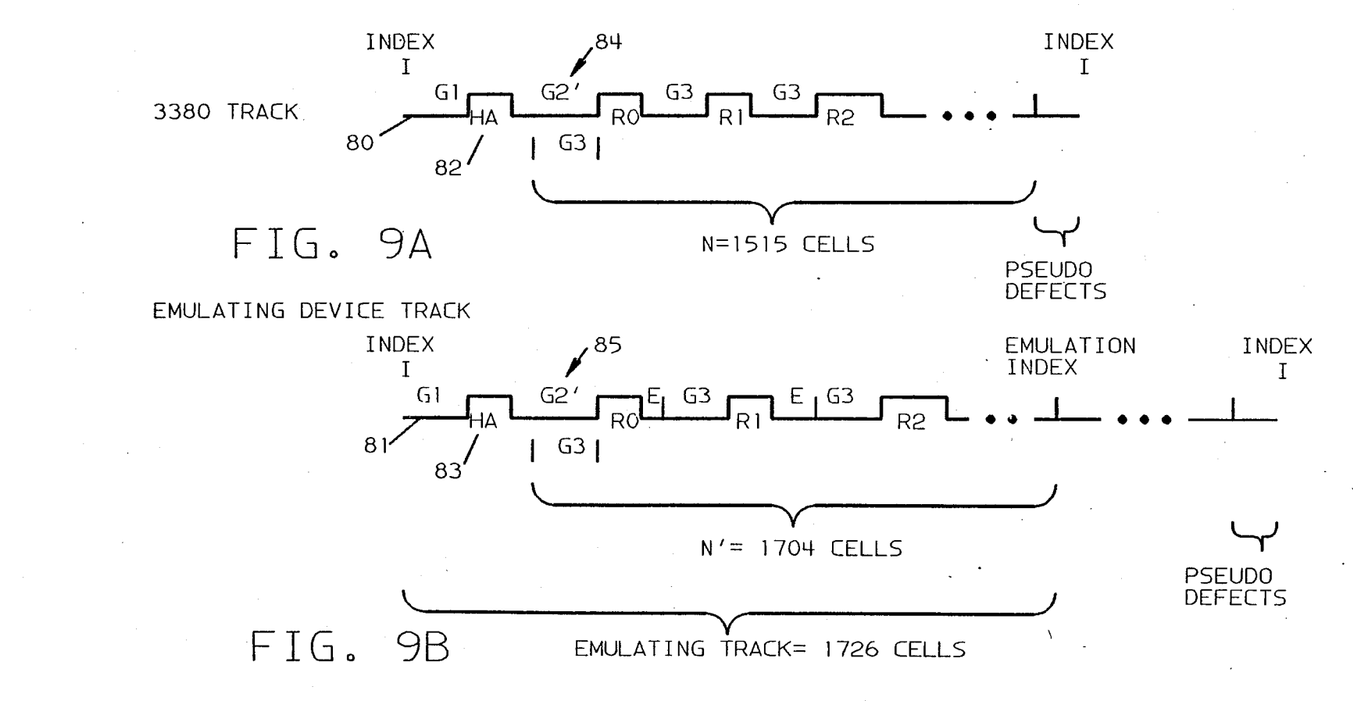
FIGS. 9A and 9B are track format charts used to illustrate the emulation of a record according to the 3380 format on the emulating device.

On the 3380 track, there are 1515 cells from the G3 in front of R0 to the end of the track as shown in FIG. 9A. So N equals 1515 as defined above, and N' equals the floor integer value of (1515 * 9/8), or 1704. Since according to this example there are 22 cells on the new device track before the G3 gap in front of R0, the emulated track size is 1704+22, or 1726 cells, and the emulation index occurs in cell 1726 as shown in FIG. 9B.

COUNT FIELD STRUCTURES

Figure 7A:
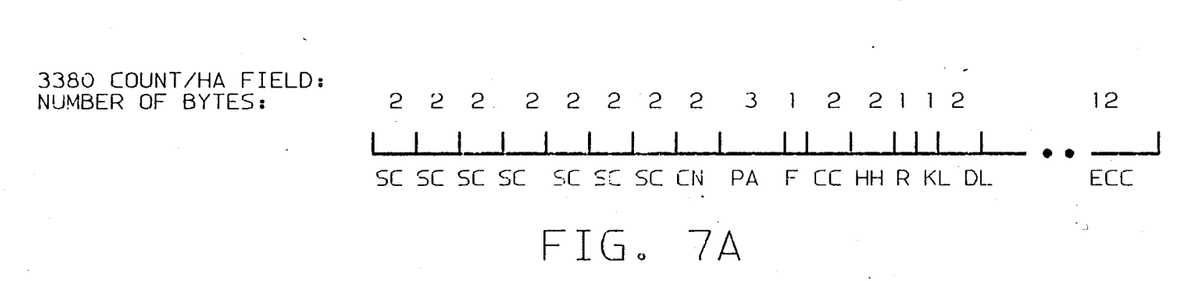
FIGS. 7A and 7B illustrate the format of the count and home address fields in the system 3380 and in a device emulating the system 3380.
Figure 7B:
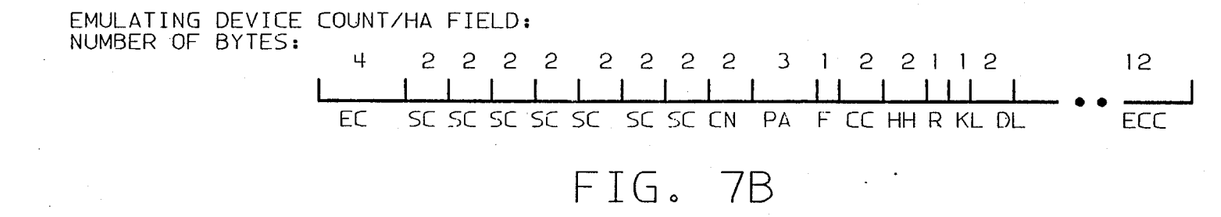

FIGS. 7A and 7B show the COUNT field and HA field structures for the 3380 and the new device of the example, respectively.

There are a total of 40 bytes in the 3380 COUNT/HA field organized as shown in FIG. 7A. The COUNT/HA field in the new device format is identical, except that it is extended by four bytes on the front of the field designated the EC field, for a total of 44 bytes. The key to FIGS. 7A and 7B showing the contents of the fields follows:

EC=emulation control.

SC=defect skip control. There are a total 7 SCs.

CN=the cell number on the track in front of the Count field. CN counts from Index beginning with cell 0.

PA=physical address of the track. This is used to identify the track.

F=flags for the track.

CC, HH, R=the id of the record.

KL=the length of the key field.

DL=the length of the data field.

From microcode point of view there are 2 differences between the 3380 and emulating devices COUNT/HA fields:

1. Bit 0 of the flag byte (F) in 3380 is not used. Bit 0 of the flag byte in the emulating device indicates emulation mode. This provides one more layer of data integrity protection. The emulation flag may alternatively placed in the HA field.

2. There are 4 extra bytes on the emulating device count field called "Emulation Control" or EC. EC is not used in emulating device HA field. EC is also not used for emulating device native mode. For emulation mode the last 2 bytes of EC is not used.

The EC on each emulating device track count field is used to keep the number of cells on 3380 track counting from the G3 in front of R0 to the location of the count field of the corresponding record Rn, assuming the track is defect free. So, as defined above, EC for emulation of the 3380 is equal to the cell number on the track in front of the count field for the record Rn on the 3380, which is stored in the COUNT field of the original record as CN, less the 17 cells that occur on the 3380 track before the G3 gap in front of the first record R0.

Notice that EC is not equal to CN−18 because CN is counting from cell 0. Note that by definition of the size of the track N set out above, EC= <N=1515.

It is shown in the next section that EC is used to detect the end of emulated track and to calculate the G3 gap extension.

GENERAL ALGORITHM FOR EMULATION

Figure 8:
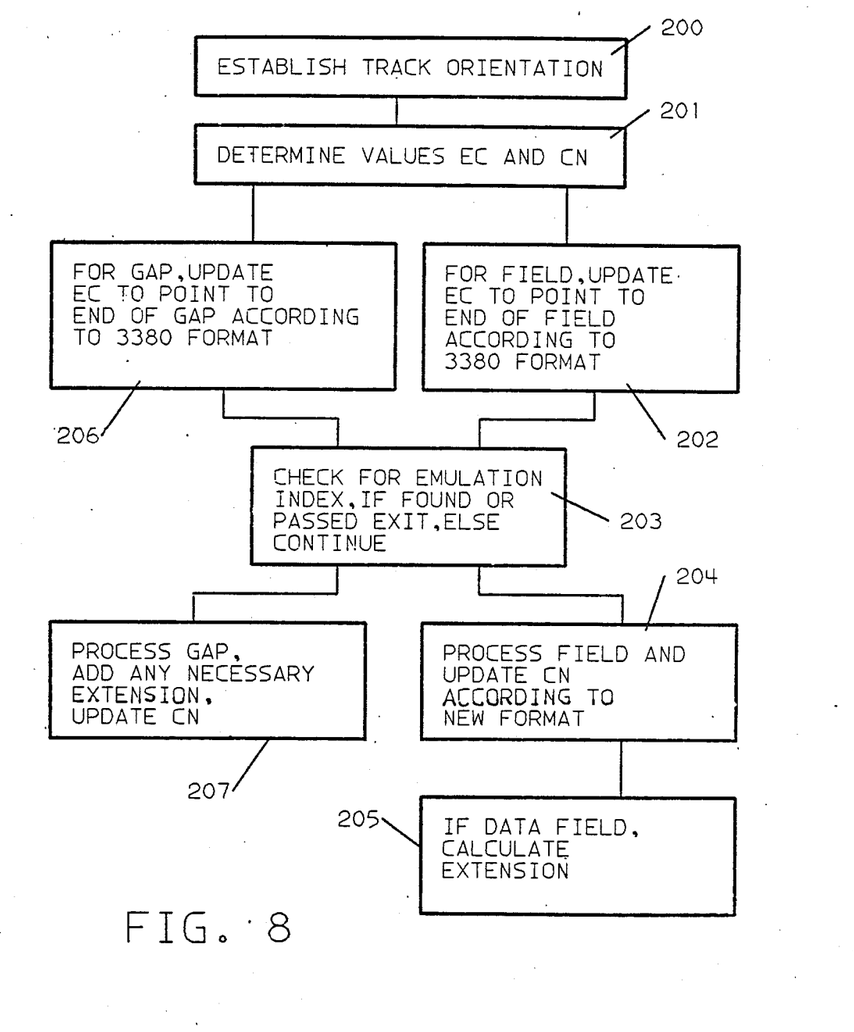
FIG. 8 is a flow chart illustrating how records are processed according to the present invention.

The general algorithm implemented in microcode in the control unit of the new device for handling the fields and gaps on a track that emulate the format of the old device, such as the 3380 in the example, is set out below with reference to FIG. 8.

1. After track orientation has been established (Block 200), find out the exact value of CN and EC (Block 201).

2. For each of the field to be processed, update EC to point to the end of the corresponding field on the defect free 3380 track (Block 202).

3.
   If EC<1515, emulation index is still down the track. Go to next item to continue.
   If EC=1515, emulation index is right after current field. Exit to handle emulation index.
   If EC>1515, emulation index has been passed. Exit to handle emulation index (Block 203).

4. Process the field and update CN by taking skip defects into account (Block 204). If it is end of data field, the ending of the data field on the new device track is extended to the cell number location equal to (21+(floor integer value of (EC*9/8))+3(# of prior defects)). Thus the gap extension is equal to (21+(floor integer value of (EC*9/8))+3(# of prior defects)−CN) (Block 205).

5. For each of the gap to be processed, update EC to point to the end of the corresponding gap on the defect free 3380 track (Block 206).

6.
   If EC<1515, emulation index is still down the track. Go to next item to continue.
   If EC=1515, emulation index is right after the gap. Exit to handle emulation index.
   If EC>1515, emulation index has been passed. Exit to handle emulation index (Block 203).

7. Process the gap with extension if necessary. Update CN by taking defect skips into account (Block 207).

The following describes how each gap and field on the emulating device track is handled in emulation mode (compare FIGS. 9A and 9B). In the COUNT fields, CN on the emulating track is updated to reflect the cell number of the current location on the emulating device track. The EC on the emulating track is also updated to reflect the cell number of the current location on the imaginary 3380 track. From EC and CN, the end of the emulating track, that is the emulation index, is detected and the record extension of the record for maintaining angular mapping is calculated.

G1 GAP ON EMULATING TRACK

The size of the G1 gaps 80,81 on both the original and the emulating device are not affected by the emulation mode. Defect skips are handled exactly like native mode.

HA ON EMULATING TRACK

The locations of the HA fields 82,83 on the original and emulating device tracks are independent of emulation mode. The size of HA field is independent of emulation mode. HA field is always read/written in native mode. BIT 0 of the flag byte (F) indicates emulation mode as mentioned above.

G2' GAP ON EMULATING TRACK

The beginning position of the first record R0 on both the original and emulating device tracks is independent of emulation mode and defined by G2' gaps 84,85. The sizes of G2' gaps 84,85 are the same as native mode. The G2' gap with skip defect, if there is any, is handled exactly like native mode.

R0 COUNT FIELD ON THE EMULATING TRACK

Clock, read, or write operations on the emulating device R0 Count field R0C are the same as native mode. The flag byte (F) in the R0 Count field R0C indicates emulation mode. CN on the R0 Count field R0C gives the exact cell location of the Count field on the emulating device track. The EC on the emulated R0 Count field points to the location of the corresponding R0 Count field location the 3380 defect free track. For emulation of the 3380 on the new device of the example, since the COUNT field R0C begins in the seventh cell in the format of the 3380, and EC identifies the cell prior to the cell in which the COUNT field begins, EC=6 in the COUNT field R0C of the emulating device for the first record R0.

G2 GAP AFTER EMULATING DEVICE COUNT FIELD

Figure 10A:
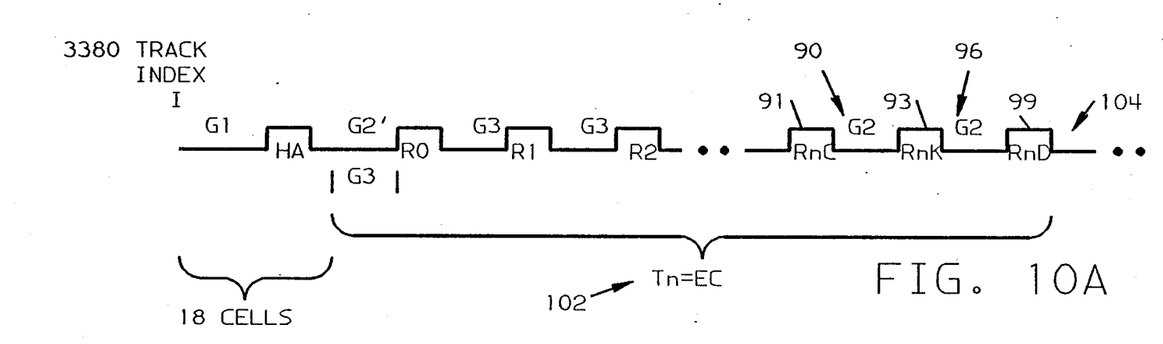
FIGS. 10A and 10B are track format charts used to further described the emulation of a record recorded according to the 3380 format on an emulating device.
Figure 10B:
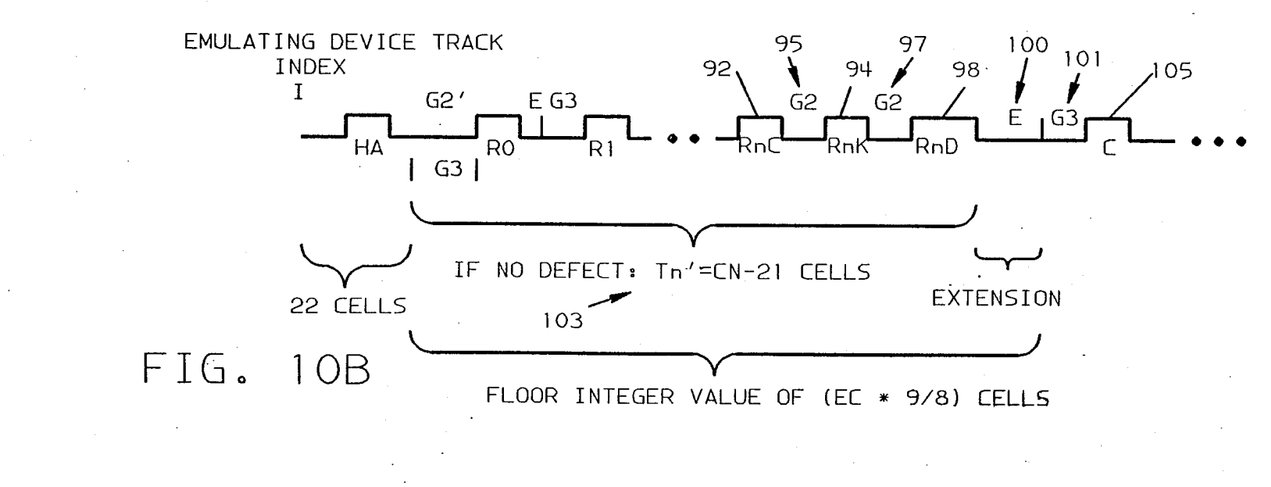

For each field and gap after the first COUNT field R0C, microcode updates the variables of EC and CN from the preceding COUNT field to detect the end of the track and generate extensions. In the preferred implementation, the following steps are carried out in the G2 gap 90, 95 (FIGS. 10A and 10B) following the COUNT field RnC 91, 92:

1. Read the CN and EC from the Count field, if it was a Read count operation. The CN and EC are already known if it was a Write Count operation.
2. Set EC=EC+2 to point to the end of the corresponding 3380 Count field 91.
3. 
    If EC<1515, emulation index is still down the track. Go to next item to continue.
    If EC=1515, emulation index is right after Count field. Exit to handle emulation index.
    If EC>1515, emulation index has been passed. Exit to handle emulation index.
4. Set CN=CN+2 to point to the end cell of the emulating Count field RnC 92.
5. Set EC=EC+7 to point to the end of the corresponding 3380 G2 gap 90.
6. 
    If EC<1515, emulation index is still down the track. Go to next item to continue.
    If EC=1515, emulation index is right after G2 gap. Exit to handle emulation index.
    IF EC>1515, emulation index has been passed. Exit to handle emulation index.
7. Issue pad 5 command to the device to pad the next 5 cells, if it is format write operation. Otherwise issue space 5 command to the device to space the next 5 cells.
8. Set CN=CN+8 to point to the end of the G2 gap 95.
9. Get the next channel command if necessary.
10. Do defect skipping if there are defects on the gap. For each defect increase CN by 3 cells.

KEY FIELD ON EMULATING DEVICE

At the end of the G2 field 90, 95 following a COUNT field 91, 92, a KEY field 93, 94 may be present as indicated by the KL variable in the COUNT field. If a KEY field 93, 94 is present, it is processed as follows:

1. If KL is not equal to zero, then continue with next item, else go to emulating Data field processing.
2. Set EC=EC+KL (key field length in cells as if written on 3380 track), so that EC points to end of the corresponding Key field 93 on the 3380 track.
3. 
    If EC<1515, emulation index is still down the track. Go to next item to continue.
    If EC=1515, emulation index is right after Key field. Exit to handle emulation index.
    If EC>1515, emulation index has been passed. Exit to handle emulation index.
4. The Key field 94 on the emulating device may include defects prior to the field but after the gap 95. So, for each such defect, update CN to CN+3 cells.
5. The Key field 94 may include defects within the field, separating it into segments. In this case, issue clock/read/write command to the device for the 1st segment of the key field 94. Update CN=CN+length of 1st segment in emulating device cells. When the next defect is skipped, update CN=CN+3 cells. CN is also updated for each of the succeeding segments and defect skips, until end of the key field 94.

G2 GAP AFTER EMULATING KEY FIELD

The following steps are processed during the G2 gap 96, 97 following a KEY field 93, 94:

1. At the beginning of the gap, set EC=EC+7 to point to the ending of the corresponding 3380 G2 gap 96.
2. 
    If EC<1515, emulation index is still down the track. Go to next item to continue.
    IF EC=1515, emulation index is right after G2 gap. Exit to handle emulation index.
    IF EC>1515, emulation index has been passed. Exit to handle emulation index.
3. Issue pad 5 command to the device to pad the next 5 cells, if it is format write operation. Otherwise issue space 5 command to the device to space the next 5 cells.
4. Set CN=CN+8 to point to the end of the G2 gap 97.
5. Get the next channel command if necessary.
6. Do defect skipping if there are defects on the gap. For each defect increase CN by 3 cells.

DATA FIELD ON EMULATING DEVICE

The following steps are processed to handle the DATA field 98 on the emulating device in the example:

1. Set EC=EC+DL (Data field length in cells as if written on 3380 track), so that EC points to the end of the corresponding Data field 99 on the 3380 track.
2. 
    If EC<1515, emulation index is still down the track. Go to next item to continue.
    If EC=1515, emulation index is right after DATA field. Exit to handle emulation index.
    If EC>1515, emulation index has been passed. Exit to handle emulation index.
3. The DATA field 98 may be moved by defects occurring after the gap 97 but before the data 98. For each such defect, update CN to CN+3 cells.
4. The Data field 98 may be separated into segments by defects occurring within the data field 98. Issue clock/read/write command to the device for the 1st segment of the Data field 98. Update CN=CN+length of 1st segment in cells. When the next defect is skipped, update CN=CN+3 cells. CN is also updated for each of the succeeding segments and defect skips, until end of Data field 98.
5. The record extension E 100 for the G3 gap 101 following a DATA field is calculated as follows:
    a. By definition of Tn 102 given above, Tn=EC.
b. By definition of Tn' 103 given above,
Tn'=CN−21−3*(number of defects prior to end of the data field).
c. The extension E 100 is given by:
E=(floor integer value of (Tn*H'/H))−Tn'
=(floor integer value of (EC*9/8))−Tn'

EXTENDED G3 GAP AFTER DATA FIELD ON EMULATING DEVICE

The G3 gap 101 at the end of Data field is processed as follows:
1. At the end of the data transfer, set EC=EC+6 to point to the end of the corresponding 3380 G3 gap 104.
2. 
   If EC<1515, emulation index is still down the track. Go to next item to continue.
   If EC=1515, emulation index is right after the gap. Exit to handle emulation index.
   If EC>1515, emulation index has been passed. Exit to handle emulation index.
3. Pad the next (5+E) cells if it is format write operation. Otherwise space (5+E) cells.
4. Set CN=CN+7+E to point to the end of the extended G3 gap 101.
5. Get the next channel command if necessary.
6. Do defect skipping if there are defects on the extended gap. For each defect increase CN by 3 cells.

COUNT FIELD FOLLOWING AN EXTENDED G3 ON THE EMULATING DEVICE

The COUNT field 105 following an extended G3 gap 101 on the emulating device is processed as follows:
1. If this is an oriented read Count field go to step 3. For an unoriented read operation, the emulated count field is read just as native mode. The flag byte (F) in the Count field indicates emulation mode. CN on the Count field gives the exact cell location of the Count field on the emulating device track. The EC on the emulating device Count field points to the corresponding Count field location on the 3380 defect free track. After the Count field, go to the G2 gap processing.
2. For an oriented format write Count field operation, the current updated value of CN and EC are stored in the count field.
3. Set EC=EC+2 to point to the end of the corresponding 3380 Count field.
   If EC+2<1515, emulation index is still down the track. Go to the next item to continue.
   IF EC+2=1515, emulation index is right after Count field. Exit to handle emulation index.
   IF EC+2>1515, emulation index has been passed. Exit to handle emulation index.
4. The Count field may be moved by defects occurring after the gap but before the field. For each such defect, upate CN to CN+3 cells.
5. After the clock/read/write Count field command has been issued, process the G2 gap as described above.

CONCLUSION

In summary, a powerful method for emulating a first recording format on a device that operates according to a second recording format is provided according to the present invention. The method is particularly useful in emulating CKD recording formats on new devices that use dissimilar CKD formats of their own. However, those skilled in the art will recognize that the method is not limited to CKD, but that it applies as well to fixed block or other formats for recording data on moving storage devices. The CKD embodiment described illustrates the power of the invention to handle complicated recording formats.

The particular embodiment disclosed has been been described for the purposes of illustration and example. As is known in the art, many variations in the embodiment described can be made without departing from the scope of the invention. It is intended that the scope of the invention be defined by the Claims attached hereto.

What is claimed is:

1. A method for locating a record in response to location information generated according to a first recording format on a moving storage device operating according to a second recording format, comprising the steps of:
   determining an original angular position of the record according to the first recording format from the location information;
   calculating in response to the original angular position and a parameter a preferred angular position for the record according to the second recording format;
   determining an actual angular position of the record recorded according to the second recording format; and
   processing an extension of the record to compensate for the difference between the preferred angular position and the actual angular position.

2. The method of claim 1, further including the step of:
   recording a remainder value indicating the difference between the preferred angular position and the sum of the actual angular position and the extension.

3. The method of claim 2, wherein the step of processing an extension further includes the steps of:
   reading the remainder value for a previous record; and
   compensating for the remainder value.

4. A method for recording a record that emulates a first recording format which includes a track reference point on a moving storage device operating according to a second recording format which also includes a track reference point, comprising the steps of:
   determining an original number of recordable units from the track reference point to the end of the record according to the first recording format;
   calculating in response to the original number and a parameter a preferred number of recordable units for the record from the track reference point to the end of the record according to the second recording format;
   counting the actual number of recordable units used in recording the record according to the second recording format from the track reference point to the end of the record; and
   recording an extension of recordable units in response to the difference between the actual number and the preferred number with the record prior to the beginning of a following record.

5. The method of claim 4, further including the step of:
   recording the original number with the record.

6. The method of claim 4, further including the step of:

recording a remainder value indicating the difference between the preferred number and the sum of the actual number and the extension with a following record.

7. The method of claim 6, wherein the step of recording in extension further includes the steps of:
reading the remainder value for a previous record; and
compensating for the remainder value.

8. The method of claim 6, wherein the step of counting the actual number includes:
adding the remainder value from a preceding record to the number of recordable units from the beginning to the end of the record as recorded.

9. The method of claim 4, further including the step of:
maintaining an emulation index at a fixed location on the track; and
responsive to the original number, checking for the emulation index.

10. The method of claim 4, wherein the parameter is determined from the maximum ratio of the number of recordable units used to record a selected record according to the second format to the number of recordable units used to record the selected record according to the first format.

11. A method for locating a record having at least a count field and a data field in response to location information generated according to a first CKD recording format which includes a track reference point on a moving storage device operating according to a second CKD recording format which also includes a track reference point, comprising the steps of:
determining an original number of recordable units from the track reference point to the end of the data field in the record according to the first CKD recording format;
calculating in response to the original number and a parameter a preferred number of recordable units from the track reference point to the end of the data field in the record according to the second CKD recording format;
counting the actual number of recordable units used in recording the record according to the second recording format from the track reference point to the end of the data field in the record; and
processing an extension of recordable units in response to the difference between the actual number and the preferred number in the gap following the data field in the record.

12. The method of claim 11, further including the step of:
recording the original number with the count field in the record.

13. The method of claim 11, further including the step of:
recording a remainder value indicating the difference between the preferred number and the sum of the actual number and the extension with a count field in a following record.

14. The method of claim 11, wherein the step of recording an extension further includes the steps of:
reading the remainder value for a previous record; and
compensating for the remainder value.

15. The method of claim 11, wherein a gap precedes each count field and the step of counting the actual number includes:
adding the remainder value from a preceding record to the number of recordable units from the beginning of the gap preceding the count field to the end of the data field in the record as recorded.

16. The method of claim 11, further including the steps of:
maintaining an emulation index at a fixed location on the track; and
responsive to the original number, checking for the emulation index prior to reading or writing the record.

17. The method of claim 11, wherein the parameter is determined from the maximum ratio of the number of recordable units used to record a selected record according to the second format to the number of recordable units used to record the selected record according to the first format.

* * * * *